United States Patent
Schaffer

[19]

[11] Patent Number: 6,024,610
[45] Date of Patent: Feb. 15, 2000

[54] CABLE CONNECTION ASSEMBLY

[75] Inventor: Ronald Richard Schaffer, Harrisburg, Pa.

[73] Assignee: The Whitaker Corporation, Wilmington, Del.

[21] Appl. No.: 09/006,984

[22] Filed: Jan. 14, 1998

[51] Int. Cl.[7] ...................................................... H01R 9/22
[52] U.S. Cl. ............................................ 439/719; 439/954
[58] Field of Search .................................... 439/709, 719, 439/527, 533, 540.1, 544, 954; 361/825, 826, 827; 385/53

[56] References Cited

U.S. PATENT DOCUMENTS

| | | | |
|---|---|---|---|
| 3,803,531 | 4/1974 | Sorensen | 439/190 |
| 4,085,992 | 4/1978 | Ayer | 439/954 X |
| 4,911,662 | 3/1990 | Debortoli et al. | 439/719 |
| 4,995,688 | 2/1991 | Anton et al. | 350/96.1 |
| 5,402,515 | 3/1995 | Vidacovich et al. | 385/135 |
| 5,451,714 | 9/1995 | Duffie | 439/954 X |

*Primary Examiner*—Khiem Nguyen

[57] ABSTRACT

A cable connection assembly including an enclosure which houses a plurality of cable connection modules, each having a frame structure, a plurality of receptacles and a housing. The receptacles are mounted through a first frame wall and a housing structure is connected to the frame structure to enclose a portion of each receptacle extending from one side of the wall. In operation, a first cable is located to one side of the wall and connected to one of the receptacles and a second cable is located to the opposite side of the wall and connected to the same receptacle to interconnect the cables.

28 Claims, 5 Drawing Sheets

CABLE CONNECTION ASSEMBLY

BACKGROUND OF THE INVENTION

1. Field of the Invention

The present invention relates to assemblies for housing cable interconnections. More particularly, the present invention relates to an assembly for housing a plurality of cable connections. Most particularly, the present invention relates to an enclosure assembly having pull out modules for terminating and interconnecting signal carrying cables, such as fiber optic cables.

2. Description of the Prior Art

Cable connection assemblies are known in which a number of panels, commonly referred to as patch panels, are mounted within an enclosure. A variety of devices, such as fiber optic connectors, may be mounted to the panel to define a cable interconnection area. Generally, a hinged enclosure door permits access to the patch panels.

Generally, each patch panel is individually mounted in the enclosure such that it can be extended from the enclosure to access the cables and connectors. Panels may be mounted in tracks or on slide mechanisms for movement into and out of the enclosure. These patch panels are generally limited in the number of connections that can be made on each panel. Therefore, a large number of panels and corresponding tracks or slide mechanisms must be provided.

Other connection assemblies provide hinges on the panels which allow the panels to be swung out from the enclosure. An example of such is shown in U.S. Pat. No. 5,402,515. While such devices may provide easier access, the swinging motion increases the risk of undesired cable crimping, particularly in fiber optic cables.

Another problem with many prior art assemblies is that both the incoming cable and the outgoing cable are exposed when the patch panels are extended from the enclosure. In many applications, it is desirable to limit access to the incoming side of the cable receptacles.

As such, there is a need for a cable connection assembly allowing higher cable density and easier access to the connectors while limiting the access to the preconnected system cables.

SUMMARY OF THE INVENTION

The present invention relates to a cable connection assembly including an enclosure which houses a plurality of cable connection modules. Each module includes a frame structure, a plurality of receptacles and a housing. The frame structure includes a first wall having first and second sides, a second wall extending from one side of the first wall and a third wall extending from the side opposite the first wall. The second and third walls extend in generally parallel planes. The receptacles are mounted through the first wall and a housing structure is connected to the frame structure to enclose the portion of each receptacle extending from one side of the first wall. In operation, a first cable is located to one side of the first wall and connected to one of the receptacles and a second cable is located to the opposite side of the first wall and connected to the same receptacle to interconnect the cables.

DESCRIPTION OF THE PREFERRED EMBODIMENTS

Figure 1:
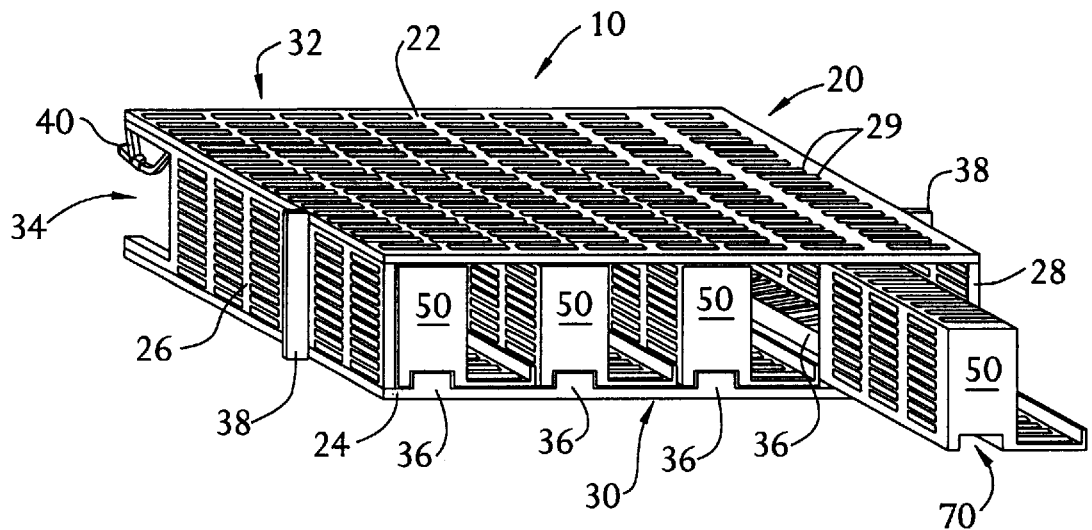
FIG. 1 is an isometric view of the cable connection assembly of the present invention.

The preferred embodiments will be described with reference to the drawing figures where like numerals represent like elements throughout. Any reference to orientation herein is for clarity only and is not intended to limit the orientation of the device.

Referring to FIG. 1, a preferred embodiment of the cable connection assembly 10 is shown. The assembly 10 generally comprises an enclosure 20 and a plurality of connector modules 50. The enclosure includes opposed top and bottom walls 22, 24 and opposed side walls 26, 28 extending therebetween. The walls 22, 24, 26 and 28 define a generally open, rectangular structure with openings 30 and 32 at the front and rear thereof. If desired, cover members (not shown) may be provided to cover the front and rear openings 30, 32. Each of the walls 22–28 is preferably made from sheet metal having a number of vent holes 29 therethrough to permit airflow through the enclosure 20.

Each side wall 26, 28 includes a mounting flange 38 for mounting the enclosure 20 in a rack system (not shown) as is known in the art. Each of the side walls 26, 28 has a notch 34 adjacent the rear opening 32. The notches 34 provide passage ways for cables 12 and fibers 14, 16 (not shown) to enter and exit the enclosure 20. Cable ties 40 depend toward notches 34 from the interior surface of top wall 22 adjacent to rear opening 32 across the width of enclosure 20. The cable ties 40 support and fix the cables 12 (not shown) entering the enclosure 20. This provides strain relief to the cables 12 and a fixed point from which the cables 12 slack inside the enclosure 20.

Figure 2:
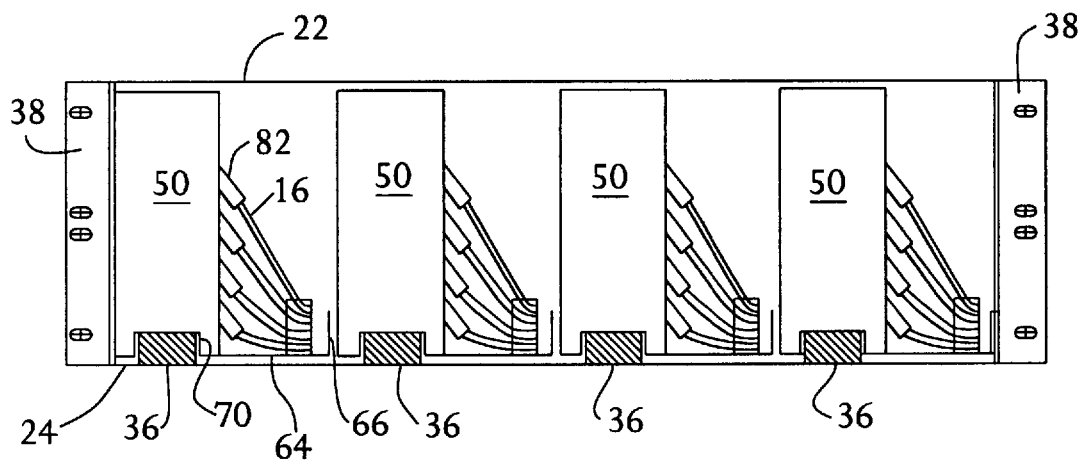
FIG. 2 is an elevation view of the cable connection assembly of the present invention.

Referring to FIGS. 1 and 2, a number of parallel rails 36 are provided on the bottom wall 24. Each rail 36 has a length that is slightly greater than the depth of module 50. Rail 36 is dimensioned to complement a notch 70 in module 50 so that the module 50 can be moved in and out of enclosure 20 in the manner of a drawer. The configuration of the rails 36 and notches 70 may be adjusted depending on the specific application. Stop and retaining means (not shown) may be provided along the rails 36 to prevent over extension and tipping of the connection modules 50.

Figure 3:
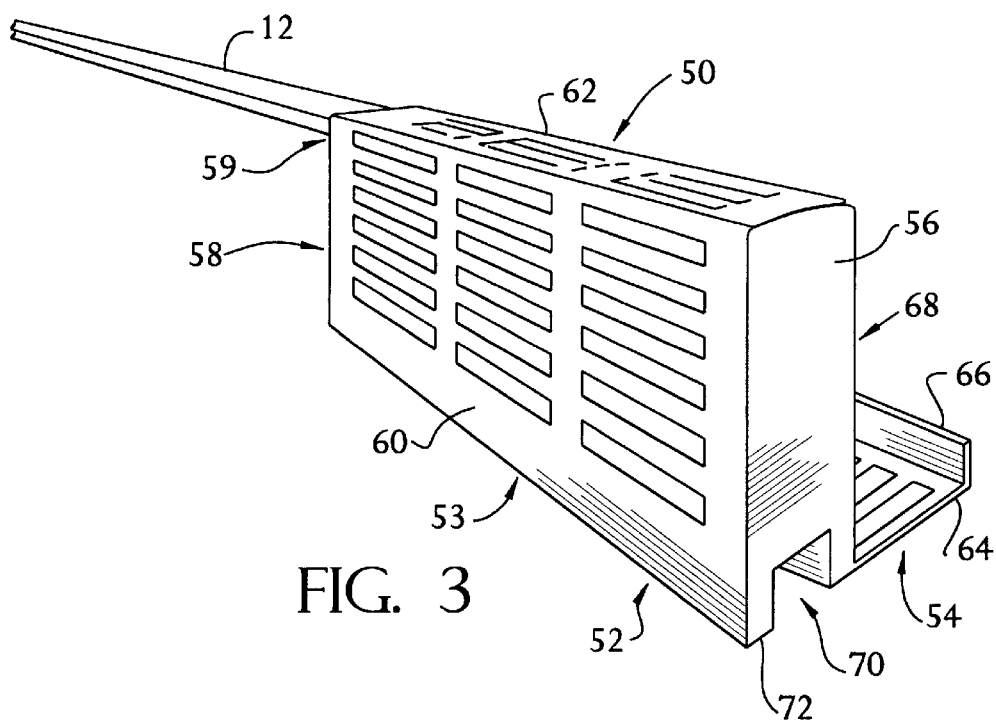
FIG. 3 is an isometric view of a connector module in accordance with the present invention.
Figure 4:
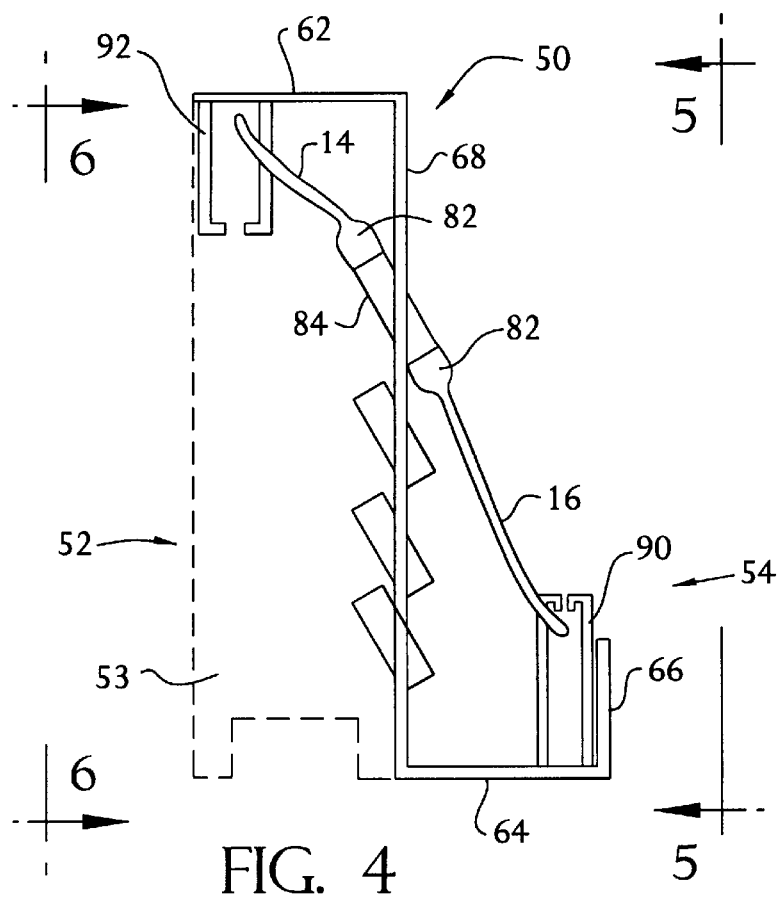
FIG. 4 is an elevation view of a connector module with its housing shown in phantom.

The connection modules 50 will now be described with reference to FIGS. 2–6. Referring specifically to FIGS. 3 and 4, each module 50 includes a system side 52 and a distribution side 54 which share a common vertical wall 68. An upper module wall 62 extends toward the system side and includes depending mounting clips 92. A lower module wall 64 extends toward the customer side. A retaining wall 66 and clips 90 extend up from the lower module wall 64. Both walls 62 and 64 are generally perpendicular to vertical wall 68.

The vertical wall 68 houses an array of connection receptacles 84. One end of each receptacle is connected to an incoming single or multi fiber cable 14 and the opposite end is configured to receive a connector 82 connected to an outgoing single or multi fiber cable 16. In the preferred embodiment, each connection module 50 has an array of approximately twenty connection receptacles 84 (see FIG. 5). The number of receptacles 84 per module 50 may be varied based on a desired application, and may vary from module to module.

As shown in FIG. 4, each receptacle 84 is mounted at an angle to vertical wall 68 so that the cable fiber end of receptacle 84 extends upward, away from wall 68. This allows the incoming cables 12 and cable fibers 14 to be directed through mounting clips 92 depending from upper module wall 62 while maintaining a minimum bend radius in the cables 12 and fibers 14. Similarly, the angle of receptacles 84 also allows outgoing cable fibers 16 to pass through lower mounting clips 90 extending from the lower module wall 64 while maintaining a minimum bend radius.

Referring to FIG. 3, the system side 52 of each module 50 is enclosed within a housing 53 comprised of front and rear walls 56 and 58, side wall 60, and lower wall 72. In the preferred embodiment, housing 53 is formed as a unitary body which is mounted to walls 62 and 68 to enclose and limit access to the system side 52 of module 50. However, end wall 60 may be provided with a hinge along one of its edges to allow access into system side 52 of module 50. Rear housing wall 58 is provided with an aperture 59 to allow the system cables 12 to enter the housing 53.

Figure 6:
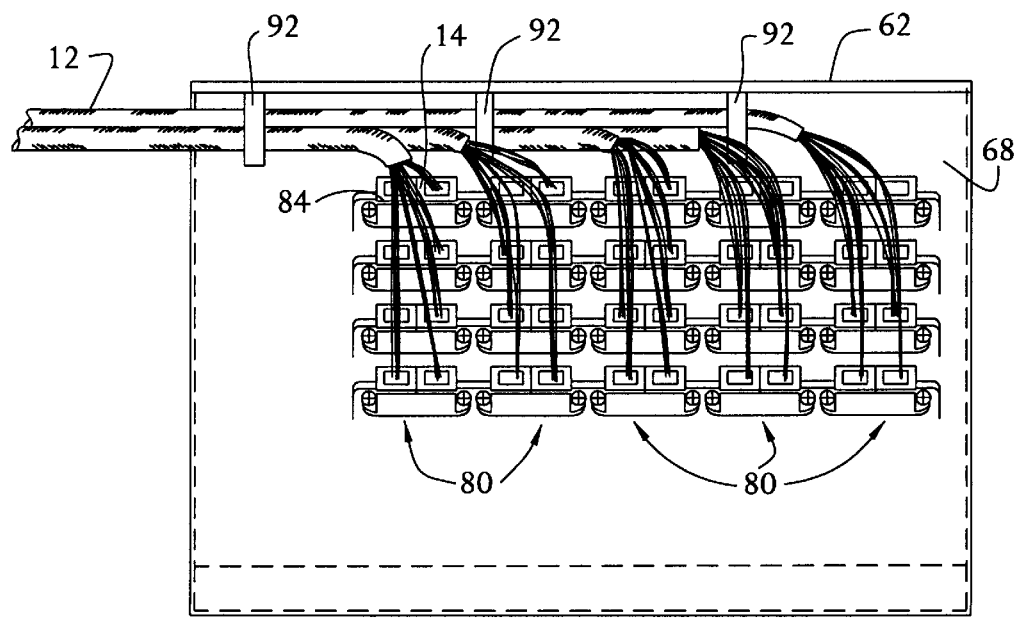
FIG. 6 is a system side elevation of the connector module with the housing shown in phantom as seen along line 6—6 in FIG. 4.

In operation, prior to shipping of the cable connection assembly 10, a number of cables 12, as shown in FIG. 6, are fed into the system side of each module 50. The cables 12 are maintained in position by upper mounting clips 92. Each cable 12 is then fanned out into individual cable fibers 14 which are connected to the receptacles 84. In the preferred embodiment, duplex cable fibers 14 are connected to each receptacle 84, for example an SC or ST style receptacle, whereby a duplex connector 82 can be attached to the opposite side of each receptacle 84. (ST is a registered trademark of Lucent Technologies, Inc.) However, the cable fibers 14 can be fanned out in any configuration, and any number and kind of receptacles and matching connectors can be used. Once the cable fibers 14 are in position, the housing 53 is mounted on the module 50. When the housing 53 is mounted, the cables 12 pass through aperture 59 in housing rear wall 58. The opposite end of each cable 12 is provided with an MPX connector (not shown) which allows the cables 12 to be connected to the system with which the cable connector assembly 10 is used.

Figure 5:
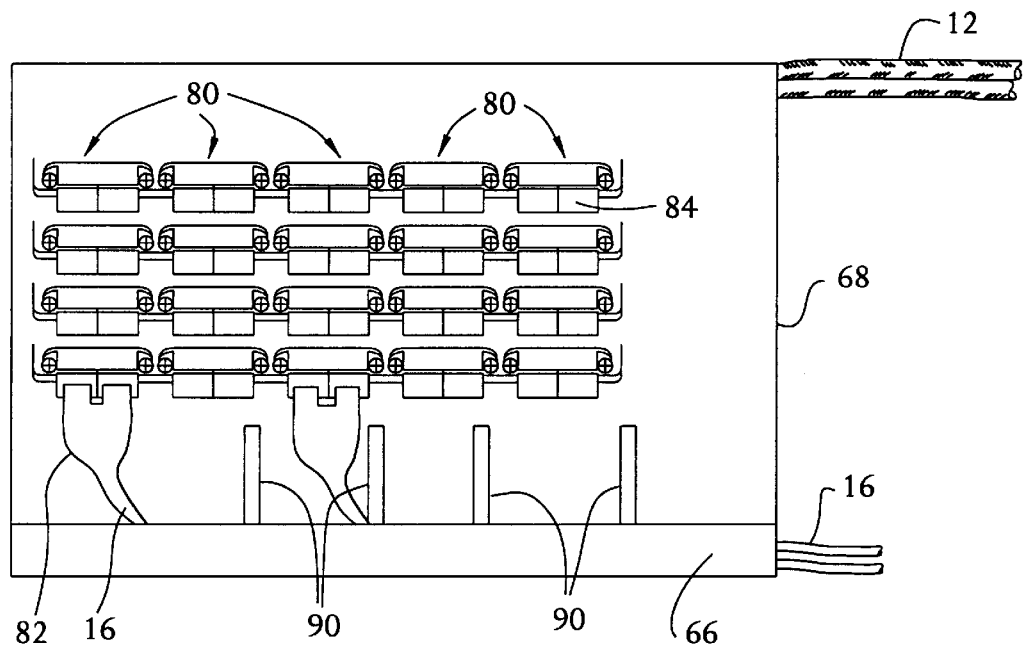
FIG. 5 is an elevation view of the connector module as seen along line 5—5 in FIG. 4.

Referring to FIG. 5, after the module 50 is assembled, the receptacles 84 extend through vertical wall 68 and are ready for interconnection with cable connectors 82. The user is free to run the incoming cable fiber 16 along lower module wall 64 and through clips 90 to mate connector 82 with a desired receptacle 84. Not all of the receptacles need to be used at any given time, and the configuration of module 50 allows connectors 82 to be mated with the appropriate receptacles 84 in accordance with a given application. The quick connection between connectors 82 and receptacles 84 allow quick modifications to be made to the system by removing or mating connectors 82 as needed.

Since all of the cables 12 and fibers 14, 16 extend toward the rear of enclosure 20, take-up racks (not shown) may be provided in the rear area of enclosure 20 to take-up and maintain any excess cable 12 or fibers 14, 16.

Figure 7:
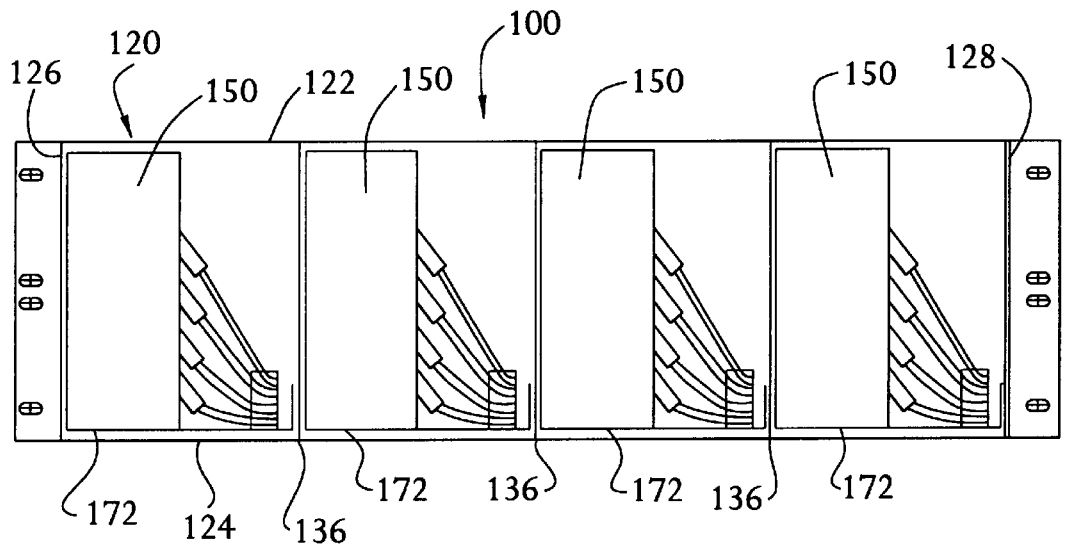
FIG. 7 is an elevation view of an alternative embodiment of the cable connection assembly.
Figure 9:
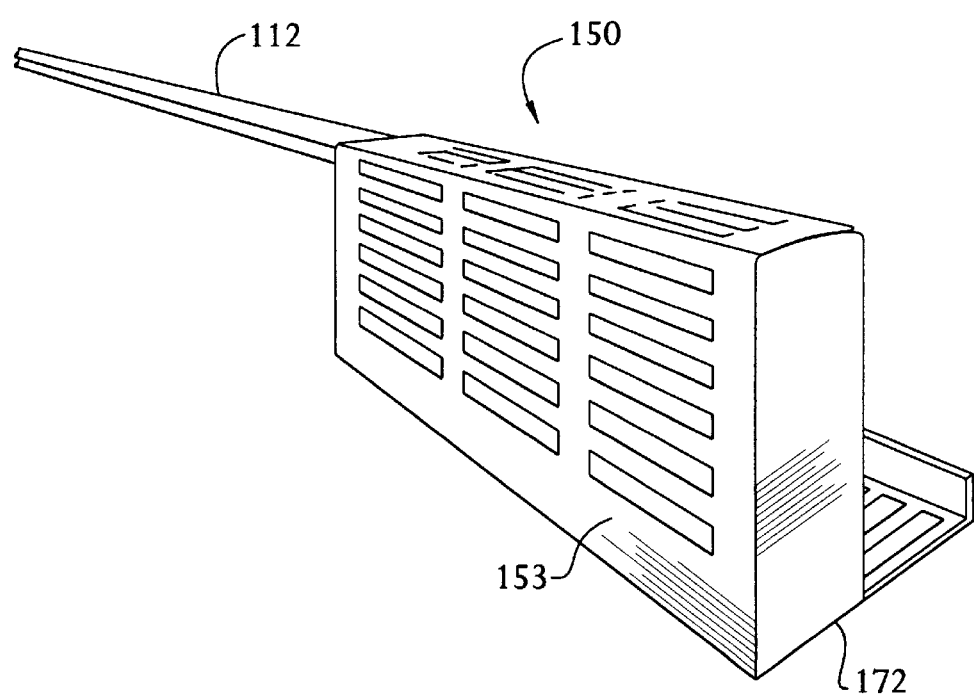
FIG. 9 is an isometric view of a connector module of the alternative embodiment.
Figure 8:
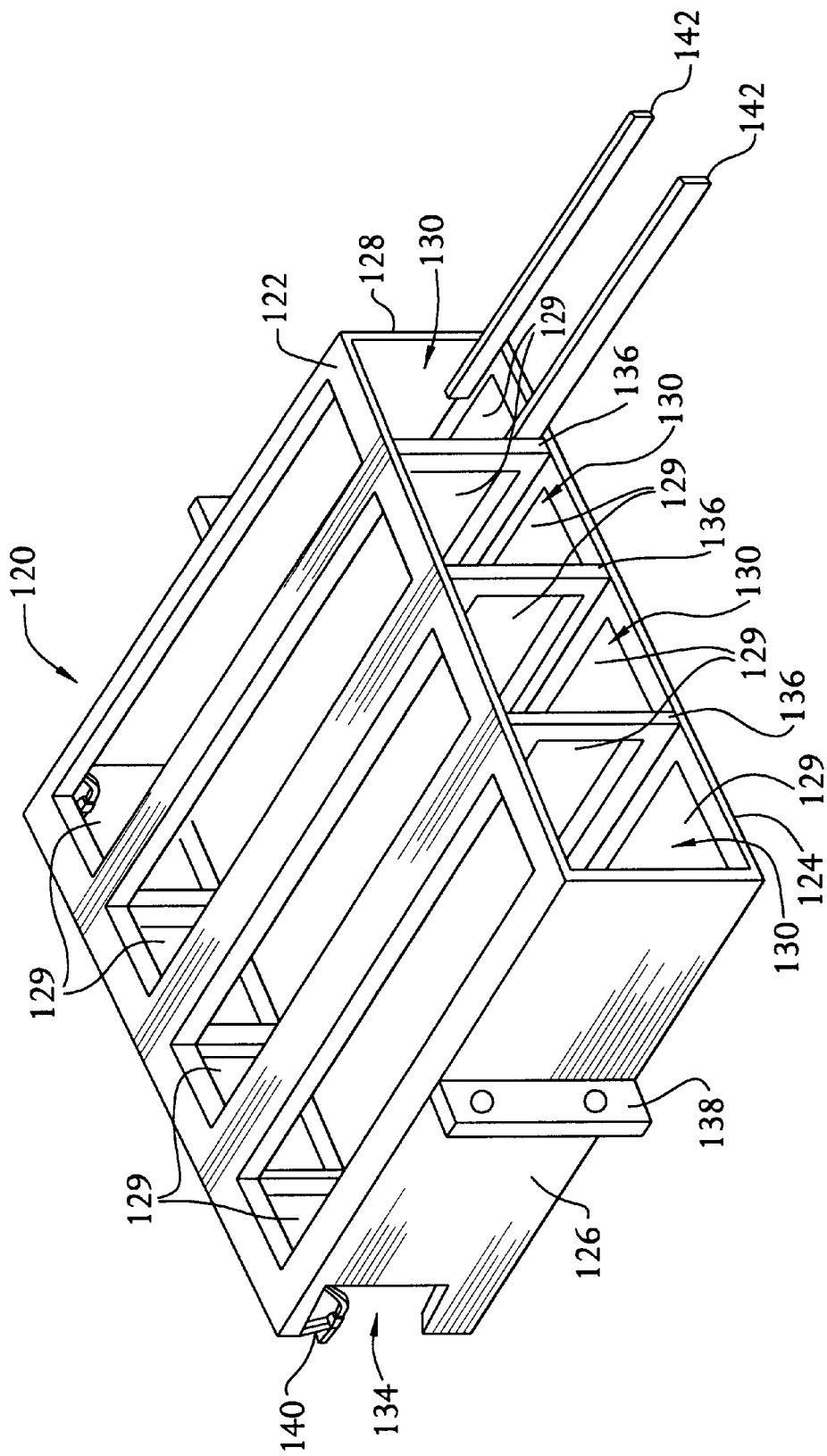
FIG. 8 is an isometric view of the enclosure of the alternative embodiment.

An alternate embodiment of the cable connector assembly 100 is shown in FIGS. 7–9. Referring to FIG. 8, enclosure 12 includes top and bottom walls 122 and 128, side walls 126 and 128, and mounting flanges 138. A number of dividing walls 136 extend between the top and bottom walls 122 and 124. The dividing walls 136 and enclosure walls 122–128 define a number of individual module cavities 130 across the width of enclosure 120. The top and bottom walls 122 and 124 have apertures 129 therethrough aligned with each module cavity 130 and each dividing wall 136 has an aperture 129 therethrough. These apertures 129 allow air flow around modules 150.

Each side wall 126, 128 is provided with a notch 134 adjacent the rear of enclosure 120 to permit cables 112 and fibers 114, 116 (not shown) to enter and exit enclosure 120. A plurality of cable ties 140 are provided along the inner surface of top wall 122 to retain the incoming cables 112. Referring to FIGS. 7 and 9, the connector modules 150 are substantially the same as modules 50 of the first embodiment, but the housing bottom walls 172 do not include a notch. Instead of moving along a rail, the modules 150 are freely inserted and extended from enclosure 120. Alternatively, as shown in FIG. 8, each module cavity 130 is provided with extension arms 142 to permit movement of the modules 150.

What is claimed is:

1. A cable connection module comprising:
   a frame structure including a first wall having first and second sides, a second wall extending from one side of the first wall and a third wall extending from the side opposite the first wall, the second and third walls extending in generally parallel planes; and
   a plurality of receptacles mounted through the first wall whereby a first cable is located to one side of the first wall and connected to one of the receptacles and a second cable is located to the opposite side of the first wall and connected to the same receptacle to interconnect the cables.

2. The module of claim 1 wherein the second and third wall planes are spaced apart and the receptacles are mounted through the first wall between the planes.

3. The module of claim 1 further comprising a housing structure connected to the frame structure to enclose a portion of each receptacle extending from the first side of the first wall.

4. The module of claim 3 wherein the housing includes an aperture to permit passage of cables to the enclosed receptacle portions.

5. The module of claim 3 wherein the housing includes a hinged portion which is opened to access the enclosed receptacle portions.

6. The module of claim 1 wherein the receptacles have first and second ends, each end configured to receive a connector extending from a respective cable.

7. The module of claim 1 wherein the receptacles are oriented at an angle relative to the first wall.

8. The module of claim 7 wherein the angle is less than 90 degrees.

9. The module of claim 8 wherein the first cable extends along the second wall and the second cable extends along the third wall.

10. A cable connection module of a type that supports interconnected optical fibers and is adapted to be slidably mounted in an enclosure which houses a plurality of the modules, the module characterized by comprising:
    a frame structure including a first wall having first and second sides, a second wall extending from one side of the first wall and a third wall extending from the side opposite the first wall, the second and third walls extending in generally parallel planes; and a plurality of receptacles mounted through the first wall whereby a first cable is located to one side of the first wall and connected to one of the receptacles and a second cable is located to the opposite side of the first wall and connected to the same receptacle to interconnect the cables.

11. The module of claim 10 wherein the second and third wall planes are spaced apart and the receptacles are mounted through the first wall between the planes.

12. The module of claim 10 further comprising a housing structure connected to the frame structure to enclose a portion of each receptacle extending from the first side of the first wall.

13. The module of claim 12 wherein the housing includes an aperture to permit passage of cables to the enclosed receptacle portions.

14. The module of claim 12 wherein the housing includes a hinged portion which is opened to access the enclosed receptacle portions.

15. The module of claim 12 wherein the housing includes a notch which is adapted to ride on a rail of the enclosure.

16. The module of claim 10 wherein the receptacles have first and second ends, each end configured to receive a connector extending from a respective cable.

17. The module of claim 10 wherein the receptacles are oriented at an angle relative the first wall.

18. The module of claim 17 wherein the angle is less than 90 degrees.

19. The module of claim 18 wherein the first cable extends along the second wall and the second cable extends along the third wall.

20. A cable connection assembly of a type having an enclosure which houses a plurality of cable connection modules, the assembly characterized by:

each module including:

a frame structure including a first wall having first and second sides, a second wall extending from one side of the first wall and a third wall extending from the side opposite the first wall, the second and third walls extending in generally parallel planes;

a plurality of receptacles mounted through the first wall whereby a first cable is located to one side of the first wall and connected to one of the receptacles and a second cable is located to the opposite side of the first wall and connected to the same receptacle to interconnect the cables; and a housing structure connected to the frame structure to enclose a portion of each receptacle extending from the first side of the first wall.

21. The assembly of claim 20 wherein the housing includes an aperture to permit passage of cables to the enclosed receptacle portions.

22. The assembly of claim 20 wherein the housing includes a hinged portion which is opened to access the enclosed receptacle portions.

23. The assembly of claim 20 wherein the enclosure includes a plurality of rails and each housing includes a notch which is adapted to ride thereon.

24. The assembly of claim 20 wherein the enclosure includes a plurality of extensions to which the modules are connected for insertion into and extension from the enclosure.

25. The assembly of claim 20 wherein the receptacles have first and second ends, each end configured to receive a connector extending from a respective cable.

26. The assembly of claim 20 wherein the receptacles are oriented at an angle relative the first wall.

27. The assembly of claim 26 wherein the angle is less than 90 degrees.

28. The assembly of claim 27 wherein the first cable extends along the second wall and the second cable extends along the third wall.

* * * * *